(12) United States Patent
Hiramoto et al.

(10) Patent No.: US 6,379,810 B1
(45) Date of Patent: Apr. 30, 2002

(54) HIGH RESISTANCE MAGNETIC FILM

(75) Inventors: Masayoshi Hiramoto; Yasuhiro Iwano, both of Nara; Hirosuke Mikami; Hiroyasu Tsuji, both of Osaka; Hiroshi Sakakima, Kyoto, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/484,197

(22) Filed: Jan. 18, 2000

(30) Foreign Application Priority Data

Jan. 18, 1999 (JP) .............................. 11-009877

(51) Int. Cl.$^7$ .............................. H01F 10/26; G11B 5/31
(52) U.S. Cl. .................. 428/469; 428/432; 428/450; 428/704; 428/900; 148/306; 148/310; 252/62.56; 252/62.57; 252/62.59; 252/62.62; 252/62.63
(58) Field of Search ................. 148/306, 310, 148/311, 312, 313, 315; 252/62.56, 62.57, 62.59, 62.62, 62.63; 428/469, 432, 433, 434, 699, 701, 702, 704, 900, 450

(56) References Cited

U.S. PATENT DOCUMENTS

| 5,183,631 A | 2/1993 | Kugiyama et al. |
| 5,352,522 A | 10/1994 | Kugiyama et al. |
| 5,432,645 A | 7/1995 | Terunuma et al. |

FOREIGN PATENT DOCUMENTS

| JP | 6-120020 | 4/1994 |
| JP | 7-86035 | 3/1995 |
| JP | 10-270246 | 10/1998 |

OTHER PUBLICATIONS

Furukawa, et al. "Soft Magnetic Properties of Nanocrystalline Fe—Ceramic Films"; IEEE Translation Journal on Magnetics in Japan; Sep. 1, 1994; vol. 9, No. 5, New York, NY; pp. 80–87.

"Fe Based Soft Magnetic Alloys Composed to Ultrafine Grain Structure", *Japan Metal Association Journal* 53 (1989). pp. 241–248, No Month.

*Primary Examiner*—Deborah Jones
*Assistant Examiner*—Jennifer McNeil
(74) *Attorney, Agent, or Firm*—Merchant & Gould PC

(57) ABSTRACT

The present invention provides a magnetic film expressed by a composition formula $T_aM_bX_cN_dO_e$ (T is a magnetic metal such as Fe, M is an alkaline earth metal such as Be, Mg, and Ca, and X is at least one selected from the group consisting of Y, Ti, Zr, Hf, V, Nb, Ta and lanthanoid), where $a+b+c+d+e=100$, $45 \leq a \leq 85$, $5.5 \leq b \leq 28$, $0.5 \leq c \leq 16$, $6 \leq b+c \leq 28.5$, $0.4 < b/c \leq 56$, $0 \leq d \leq 10$, and $8 \leq d+e \leq 40$. The magnetic film comprises mainly metal magnetic crystal grains having an average crystal grain diameter of not more than 15 nm and a grain boundary product. The grain boundary product substantially separates the metal magnetic crystal grains. The main component of the metal magnetic crystal grains is the T. The grain boundary product contains at least an oxide or a nitride of the M and the X. The magnetic film has a saturation magnetic flux density of not less than 0.8 T and an electric resistivity of not less than 80 $\mu\Omega$cm.

14 Claims, No Drawings

HIGH RESISTANCE MAGNETIC FILM

BACKGROUND OF THE INVENTION

1. Field of the Invention

The present invention relates to a high resistance magnetic film used in magnetic application components such as a magnetic recording head, a magnetic reproduction head, a magnetic sensor including a magnetic impedance sensor, a magnetic coil, an inductor, a transformer, and a magnetic shield.

2. Description of the Prior Art

In recent years, the need for high frequency magnetic devices is high, and magnetic materials having excellent soft magnetic characteristics at a frequency of 100 MHz or more are required. A magnetic material used at such a high frequency requires a loss mainly due to eddy current and ferromagnetic resonance to be small. In other words, from the aspect of material properties, mainly high electrical resistivity or high saturation magnetic flux density are required.

Conventionally, Japanese Laid-Open Patent Publication No. (Tokkai-Hei) No. 4-21739 proposed a composite material obtained by forming an oxide on surfaces of magnetic metal particles and sintering it in order to achieve high saturation magnetic flux density of about 1 T or more. As the oxide, Japanese Laid-Open Patent Publication No. (Tokkai-Hei) No. 6-120020 proposed Mg—O, Ca—O, Si—O, Al—O, Ti—O or the like.

On the other hand, research as to FeNbCuSiB or the like reported in Japan Metal Association Journal 53 (1989) 241 shows that the soft magnetic characteristics can be improved by miniaturizing the size of magnetic crystal grains constituting a magnetic body to about 20 nm or less. Furthermore, Japanese Laid-Open Patent Publication No. (Tokkai-Hei) No. 7-86035 proposed a FeM'NO (M'=Be, Mg, Al, Si, Ca, etc.) material formed by sputtering as a material having both improved soft magnetic characteristics and high saturation magnetic flux density, which are achieved by using the composite material and effecting such a high level of miniaturization.

The conventional FeM'NO material proposed in the related art is produced by two-phase separation into Fe microcrystals having a bcc crystal structure and a M'O or M'N compound forming the grain boundary thereof by selective oxidation or selective nitriding of a M' element caused by a difference in the free energy of oxide or nitride formation between Fe and M' elements that are forming the film during sputtering.

However, sputtering is a technique that degrades a target element to an atomic or molecular level and effects synthesis on a substrate. In addition, it is substantially difficult to effect complete two-phase separation of the elements only by the energy during sputtering. Therefore, it is inevitable that a Fe microcrystal of the FeM'NO material is in the form of a solid solution with an O, N or M' element immediately after the formation of the film. For this reason, even if microcrystals having Fe as a main component maintain a bcc structure, the magnetostriction constant of the material becomes as large as $1 \times 10^{-5}$ or more, or the crystal magnetic anisotropy energy of Fe becomes large. Thus, the soft magnetic characteristics deteriorate. Therefore, in the case where these materials are to be produced for industrial applications, it is difficult to control the magnetostriction to be low and the soft magnetic characteristics to be high in a large area due to even a small discrepancy in the composition or the like.

The above described points were made evident as a result of the study of the inventors of the present invention on magnetic films such as FeSiO, FeMgO or the like.

The two-phase separation can proceed further by raising the substrate temperature during formation of a FeM'NO film or performing a heat treatment after the film is formed. However, since the temperatures for these heat treatments are generally 400° C. or more, the soft magnetic characteristics deteriorate due to large crystal grains, or the film cannot be used in a device that requires a low temperature process at a temperature lower than that temperature. Moreover, in general, it is known that the optimum relationship between the saturation magnetic flux density and the electric resistivity is different between magnetic devices, even the same types of devices, depending on the size, the frequency used or the like. Nevertheless, conventionally, a method for optimum adjustment of these characteristics is not known.

SUMMARY OF THE INVENTION

Therefore, with the foregoing in mind, it is an object of the present invention to provide a magnetic film that has high resistance, low magnetostriction and high soft magnetic characteristics, and is excellent in practical aspects such as adjustment of the characteristics.

In order to achieve the above object, the magnetic film of the present invention is expressed by a composition formula $T_aM_bX_cN_dO_e$ (where a, b, c, d and e represent at. % and are values satisfying the following equations, T is (1) Fe or (2) a metal comprising not less than 30 at. % of Fe and at least one selected from the group consisting of Co and Ni, M is at least one selected from the group consisting of Be, Mg, Ca, Sr and Ba, and X is at least one selected from the group consisting of Y, Ti, Zr, Hf, V, Nb, Ta and lanthanoid). The magnetic film comprises mainly metal magnetic crystal grains having an average crystal grain diameter of not more than 15 nm and a grain boundary product. The main component of the metal magnetic crystal grains is the T. The grain boundary product contains at least an oxide or a nitride of the M and the X. The magnetic film has a saturation magnetic flux density of not less than 0.8 T and an electric resistivity of not less than 80 $\mu\Omega$cm.

$a+b+c+d+e=100$ $45 \leq a \leq 85$, $5.5 \leq b \leq 28$, $0.5 \leq c \leq 16$, $6 \leq b+c \leq 28.5$, $0.4 < b/c \leq 56$, $0 \leq d \leq 10$, and $8 \leq d+e \leq 40$.

Lanthanoid specifically refers to La, Ce, Pr, Nd, Pm, Sm, Eu, Gd, Tb, Dy, Ho, Er, Tm, Yb and Lu. It is preferable that the grain boundary product substantially separates the metal magnetic crystal grains. In this specification, "main component" means a component included in an amount more than 50 atomic %, preferably more than 70 atomic %. The magnetic film of the present invention can contain impurities of inert elements such as Ne, Ar, Kr, Xe or the like in an amount not more than 1 atomic %. If the impurities are C, B, F, S, P or the like, the magnetic film of the present invention can contain them in an amount not more than 5 atomic %.

Throughout the description below, % for a composition ratio means atom %.

M and X are relatively hard to form a solid solution with T. Both of the elements are characterized by having a smaller free energy for oxide or nitride formation than that of T. Among them, M tends to have a large free energy for oxide formation, and an X element tends to have a large free energy for nitride formation. When a film is produced in the above composition range, since M or X that forms a solid solution in the metal magnetic crystal grains is present only in a small amount, an increase of the magnetostriction and the crystal magnetic anisotropy energy due to the solid solution of the elements is relatively small in the obtained magnetic film. Moreover, M or X forms an oxide or nitride so as to suppress grain growth mainly of magnetic crystal grains or form a grain boundary having a high resistance.

In this case, in the present invention, combination ratios of M or X and oxygen and nitrogen are selected as those described above. As a result, the width of the grain boundary or the coating ratio of magnetic crystal grains can be controlled, so that the saturation magnetic flux density and the electric resistivity can be selected arbitrarily from wide ranges as well as the soft magnetic characteristics.

M, which is an alkaline earth metal, generally is quite reactive, so that it is preferable that it is used in the form of a stable compound for industrial handling. For example, in the case where M is Ca, it is more convenient to be in the form of CaO for handling, more preferably an oxide of M and X such as $CaTiO_3$ or $CaZrO_3$ rather than Ca alone.

For example, the inventors of the present invention experimentally confirmed that in the case where Fe and $CaTiO_3$ were sputtered in an Ar atmosphere, the magnetic film contained O in an amount larger than that defined by the stoichiometric ratio. This excessive O forms a solid solution with Fe so that the magnetostriction can increase. However, excessive formation of solid solution with Fe can be suppressed, for example by adding X such as Ti. As a result, the magnetostriction can be reduced. It also was confirmed experimentally that this is the case not only for Ca, but is a common phenomenon for all the M elements as described above. Thus, the magnetostriction of the magnetic film can be suppressed by a selective reaction of M and X having different free energies for oxide and nitride formation with excessive O and N dissolved in T.

The lower limit of the amount of T is 45% in order to make sure that the saturation magnetic flux density is 1T or more. The upper limit is 85% to provide sufficient M, X, O and N for miniaturization of T.

The total amount of M and X is at least 6% to miniaturize T, and is not more than 28.5% in order to keep the saturation magnetic flux density sufficiently high.

The amount of M is 5.5% or more and the amount of X is 0.5% or more to ensure the effect. Furthermore, the ratio of M to X is in the range from 0.4 to 56, so that the resistivity can be controlled to various values without compromising the soft magnetic characteristics. This is believed to be due to the tendency that the magnetic film using a M—O oxide can provide the soft magnetic characteristics even when it has a relatively low resistivity, and the magnetic film using a X—O oxide generates the soft magnetic property when it has a relatively high resistivity.

The amount of O and N is at least 8% to make sure that the electric resistivity (specific resistance) is 80 $\mu\Omega$cm or more. The N element allows control of the electric resistivity in a wide range, because it has a smaller resistance increasing ratio with respect to the amount added than that of the O element. Furthermore, when the total amount of O and N exceeds 40%, the crystal grain boundary becomes too thick, so that the exchange interaction between magnetic crystal grains is weakened and the soft magnetic characteristics deteriorate, though the resistance becomes high.

These and other advantages of the present invention will become apparent to those skilled in the art upon reading and understanding the following detailed description.

DESCRIPTION OF THE PREFERRED EMBODIMENTS

In the magnetic film of the present invention, it is preferable that the magnetic film has a composition expressed by a composition formula $Fe_aMg_bX_cN_dO_e$ (where a, b, c, d and e represent at. % and are values satisfying the following equations), and X is the same as above:

$a+b+c+d+e=100$, $50 \leq a \leq 85$, $5.5 \leq b \leq 25.5$, $0.5 \leq c \leq 11$, $6 \leq b+c \leq 26$, $1 \leq b/c \leq 51$, $0 \leq d \leq 10$, and $8 \leq d+e \leq 35$.

This preferable embodiment can provide a magnetic film having a particularly high resistivity, soft magnetic characteristics, and a high saturation magnetic flux density (1T or more).

It is relatively hard to form a solid solution of Mg with Fe or an intermetallic compound of Mg with Fe. Therefore, the increase of magnetostriction and crystal magnetic anisotropy energy caused by the solid solution with Fe is small, and the phase separation not only between Fe and Mg—O or Mg—N, but also of Fe and Mg itself can achieve the miniaturization of Fe crystal even with a relatively small total amount of non-magnetic elements added. As a result, both the high saturation magnetic flux density and the soft magnetic characteristics can be achieved.

Furthermore, Mg and X form an oxide or a nitride so as to suppress grain growth, mainly of magnetic crystal grains, and form a grain boundary having a high resistivity. In particular, when Mg is combined with X, which has a different free energy for oxide or nitride formation or a different diffusion rate in $\alpha$-Fe from that of Mg, the amount of O or excessive N dissolved in Fe can be controlled so as to adjust the magnetostriction.

The lower limit of the amount of Fe is preferably 50% for large saturation magnetic flux density. The upper limit is 85% to provide sufficient M, X, O and N for miniaturization of Fe and high resistance of the film.

The total amount of Mg and X is at least 6% for miniaturization of Fe and high resistance of the film. The amount of X is 0.5% or more to ensure the effect.

Furthermore, the amount of Mg is not less than that of X, so that the resistivity can be controlled in a wide range. The amount of O and N is at least 8% to make sure that the electric resistivity (specific resistance) is 80 $\mu\Omega$cm or more. The N element allows control of the electric resistivity in a wide range, because it has a smaller resistance increasing ratio with respect to the amount added than that of the O element. Furthermore, the total amount of O and N preferably is 35% or less in view of the saturation magnetic flux density.

It is preferable that the magnetic film is expressed by a composition formula in which $e+q\times d \leq (b+c\times n)\times 1.35$ (where b, c, d, and e are the same as above, n is a value in the range of 1–2.5 defined by an oxide $XO_n$ where X is at its maximum valence, q is a weighted average of a total amount of a M element and a X element obtained by weighting with the following values: 2.5 for V, Nb and Ta, 2 for Ti, Zr, Hf, Ce, Pr and Th, and 1.5 for other elements) is satisfied.

This preferable embodiment can achieve both low magnetostriction and high resistance.

In the above equation, b should be thought of as b×1 for purposes of accuracy. This is based on the ratio of M to O in an oxide MO with the maximum valence (specifically, at least one selected from the group consisting of BeO, MgO, CaO, SrO, and BaO).

In the above equation, when d=0 (no nitrogen is contained in the magnetic film), $e \leq (b+c\times n)\times 1.35$.

On the other hand, with respect to an oxide with the maximum valence of X, the ratio to oxygen varies depending on X. Therefore, n also varies depending on X. For example, as in the case of q described above, when X is Y, La or the like, n is 1.5, and n is 2 for Ti, Zr, Hf or the like, and n is 2.5 for V, Nb or Ta.

When X contains 2 or more kinds of elements, n is an atom weighted average (an average obtained as a result of weighting based on atom %).

When $e+q\times d$ exceeds $(b+c\times n)\times 1.35$, the magnetostriction tends to be large.

It is more preferable that a subscript e is in the range $(b+c\times n)\times 0.9 \leq e+q\times d \leq (b+c\times n)\times 1.1$. Both low magnetostriction and high resistance, and soft magnetic characteristics and high saturation magnetic flux density, can be achieved further. Here, when d=0, the above equation is $(b+c\times n)\times 0.9 \leq e \leq (b+c\times n)\times 1.1$.

In the magnetic film of the present invention, it is preferable that X is at least one selected from the group consisting of Zr, Nb, Hf and Ta, because the addition reduces the magnetostriction significantly. The content thereof is more preferably in the range $0.5 \leq c \leq 5$, when a particular focus is on the saturation magnetic flux density.

Furthermore, in the magnetic film, not more than 5% of T can be substituted with at least one selected from the group consisting of Ru, Rh, Ir, Pd, Pt, Ag and Au. In particular, a magnetic film having a saturation magnetic flux density of 1.4 T or more can have a high corrosion resistance. It is preferable that the amount of the substitution is 0.5% or more in order to improve the corrosion resistance. On the other hand, it is preferable that the amount of the substitution is 5% or less in order to suppress the reduction of the saturation magnetic flux density.

Furthermore, it is preferable that the magnetic film of the present invention includes a region where the composition is changed with respect to at least the M element substantially periodically in a direction perpendicular o the film, because the soft magnetic characteristics together with high saturation magnetic flux density can be achieved easily.

In the magnetic film of the present invention, it is preferable that the cycle of the compositional change in the direction perpendicular to the film is not more than 10 nm, because the film can be provided with higher soft magnetic characteristics.

It is preferable to produce the magnetic film of the present invention by supplying M and O to the magnetic film mainly by sputtering an oxide of the M, because the magnetic crystal grains can be miniaturized with a smaller amount of M and O added.

It is preferable to produce the magnetic film of the present invention by sputtering a composite target where a metal and a compound are arranged, while moving a substrate in at least two directions relative to the composite target, thereby forming the film on the substrate, because a film having a uniform composition can be produced even in a relatively large area.

Furthermore, it is preferable to produce the magnetic film of the present invention by sputtering a composite target where a metal and a compound are arranged in the same electrode or sputtering a metal target and a compound target on at least two electrodes, while applying a bias voltage to a substrate, thereby forming the film on the substrate, because it becomes to easy to control mainly the amount of O or N in the magnetic film to a preferable range.

Furthermore, the magnetic film of the present invention is provided with more excellent soft magnetic characteristics by performing a heat treatment at a temperature not more than 350° C. after the film is formed.

The magnetic thin film having the structure and composition of the present invention is best formed by an evaporation method in a low gas pressure atmosphere. Among evaporation methods preferable are typical sputtering techniques such as high frequency magnetron sputtering, DC sputtering, facing target sputtering and ion beam sputtering, a reactive sputtering technique in which a reactive gas introduction section is provided in the vicinity of a substrate, or a reactive evaporation method in which a reactive gas introduction section is provided in the vicinity of a substrate and a dissolution section for dissolving an evaporation material is provided.

In the case where a sputtering technique is used, especially when an oxide or a nitride is used as a supply source of an oxygen or nitrogen element, the following sputtering techniques are preferable. A first preferable sputtering technique uses a composite target where a metal or alloy, an oxide, a nitride and an element to be added such as a metal element are arranged as appropriate on the same electrode. Their compositions are determined based on the composition of the magnetic film of the present invention after the film is formed. Another preferable technique is co-sputtering in which targets of a metal, an alloy, an oxide or a nitride are arranged in a plurality of electrodes and discharge is effected at the same time, so that elements are supplied onto a substrate at the same time. Another preferable technique is tandem sputtering in which a substrate moves sequentially immediately above targets of a metal, an alloy, an oxide or a nitride arranged on a plurality of electrodes.

When the composite target is used, it is preferable to form a film while moving the substrate itself in at least two directions in order not to be affected by the film composition distribution in the substrate corresponding to the places where additive pellets are arranged. This is preferable also in co-sputtering and tandem sputtering for an uniform composition.

Furthermore, when tandem sputtering is performed, a preferable structure for compositional change can be formed by adjusting the rate for film-formation from each target and the residence time or the travel time of the substrate above each target. Similarly, such compositional change can be achieved by changing an incident angle onto the targets periodically, or introducing a reactive gas periodically during sputtering. In all of these methods, uniaxial anisotropy can be formed on the magnetic film by forming the film while applying a magnetic field to the substrate in one direction or performing a heat treatment at about 350° C. or less while applying a magnetic field in one direction.

EXAMPLE

Hereinafter, the present invention will be described by way of examples, which are not limiting.

In the following examples, magnetic films were produced using RF magnetron sputtering. The substrate temperature as described in the following description has a range from room temperature to about 100° C. This is a natural temperature increase caused by the energy during formation of the films, and preferable magnetic thin films of the examples of the present invention can be produced at a temperature of 300° C. or less. The film structure was observed with X-ray diffraction (XRD) and a transmission electron microscope (TEM). The composition was analyzed with electron probe microanalysis (EPMA), and the coercive force was evaluated with a BH loop tracer. The saturation magnetic flux density was examined by vibration sample magnetometry (VSM).

Example 1

The results of the examination of $Fe_aMg_bX_cN_dO_e$ films are shown below. The conditions under which the films were formed were as follows.

Substrate: non-magnetic ceramic substrate, a Si substrate or a C substrate (the Si substrate and the C substrate were used for analysis of the composition)

Substrate temperature: room temperature–100° C.

Target: a 5×5 mm $SiO_2$ or MgO chip or $Mg_3N_2$ chip and a 5×5 mm metal element chip were arranged on a 3 inch Fe target in such a manner that the compositions in Table 1 below can be achieved.

Target size: 3 inch

Discharge gas pressure: 8 mTorr

Discharge power: 200 W

Sputtering gas: Ar

Tables 1 and 2 show the magnetic characteristics and the compositions of magnetic films after a heat treatment at 250° C. was performed in a vacuum. The thickness of all the magnetic films was 1 μm.

TABLE 1

| Sample | Composition of Magnetic films (at. %) | Coercive force (Oe) | Magneto-striction (× 10⁻⁵) | Resistivity (μΩcm) |
|---|---|---|---|---|
| aa | $Fe_{64}Si_{10}O_{26}$ | 3.2 | 1.3 | 250 |
| ab | $Fe_{64}Mg_{15}O_{21}$ | 1.2 | 1.0 | 150 |
| ac | $Fe_{62}Mg_{16}Si_1O_{21}$ | 1.7 | 1.1 | 170 |
| ad | $Fe_{60}Mg_{16}Si_2O_{22}$ | 1.9 | 1.2 | 240 |
| ae | $Fe_{62}Mg_{16}Al_2O_{20}$ | 1.6 | 1.0 | 190 |
| af | $Fe_{62}Mg_{16}Ti_1O_{21}$ | 1.2 | 0.7 | 180 |
| ag | $Fe_{61}Mg_{16}Ti_2O_{21}$ | 1.1 | 0.6 | 190 |
| ah | $Fe_{62}Mg_{16}V_1O_{21}$ | 1.1 | 0.6 | 180 |
| ai | $Fe_{61}Mg_{16}V_2O_{21}$ | 1.3 | 0.5 | 210 |
| aj | $Fe_{63.5}Mg_{15}Zr_{0.5}O_{21}$ | 0.9 | 0.6 | 160 |
| ak | $Fe_{62.5}Mg_{15}Zr_{1.5}O_{21}$ | 0.9 | 0.3 | 200 |
| al | $Fe_{62.5}Mg_{16}Nb_{0.5}O_{21}$ | 0.6 | 0.7 | 160 |
| am | $Fe_{60.5}Mg_{16}Nb_{2.5}O_{21}$ | 0.7 | 0.4 | 200 |
| an | $Fe_{61.5}Mg_{16}Hf_{1.5}O_{21}$ | 0.9 | 0.3 | 190 |
| ao | $Fe_{60.5}Mg_{16}Hf_{2.5}O_{21}$ | 0.9 | 0.2 | 210 |
| ap | $Fe_{61.5}Mg_{16}Ta_{1.5}O_{21}$ | 1.0 | 0.4 | 190 |
| aq | $Fe_{60.5}Mg_{16}Ta_{2.5}O_{21}$ | 1.0 | 0.4 | 210 |

TABLE 2

| Sample | Composition of Magnetic films (at. %) | Magnetostriction (× 10⁻⁵) |
|---|---|---|
| ar | $Fe_{64.9}Mg_{13}Hf_{1.1}O_{21}$ | 0.6 |
| as | $Fe_{65.0}Mg_{13}Hf_{1.0}O_{21}$ | 0.6 |
| at | $Fe_{65.1}Mg_{13}Hf_{0.9}O_{21}$ | 0.6 |
| au | $Fe_{64.9}Mg_{12}Hf_{1.1}O_{22}$ | 0.6 |
| av | $Fe_{63.6}Mg_{13}Hf_{2.4}O_{21}$ | 0.5 |
| aw | $Fe_{63.7}Mg_{13}Hf_{2.3}O_{21}$ | 0.5 |
| ax | $Fe_{65.3}Mg_{13}Hf_{1.7}O_{20}$ | 0.5 |
| ay | $Fe_{65.2}Mg_{12}Hf_{1.8}O_{20}$ | 0.5 |

As shown in Tables 1 and 2, an element is added to FeMgO based materials. When Si or Al, which has a high property of forming a solid solution with Fe, is added, the magnetostriction is not reduced (samples aa to ae). As shown in samples af to aq, when an element that hardly forms a solid solution with Fe is added, even an amount of 0.5% reduces the magnetostriction and raises the resistivity.

In addition, when an effect of adding lanthanoid, which hardly forms a solid solution with Fe, was examined in the same manner, the same effect was observed. Particularly, the effect of Zr, Nb, Hf, or Ta on the reduction of the magnetostriction was significant.

The saturation magnetic flux density of all magnetic films of sample af to ay was 1 T or more, and the average crystal grain diameter of magnetic crystal grains obtained with X-ray diffraction was 15 nm or less. TEM observation of sample am produced the following results. The microparticles of α-Fe were substantially covered with a grain boundary product and have a composite structure in which the microparticles were separated from each other. The grain boundary product had a low crystallinity so as to be regarded as being amorphous. The composition of the grain boundary product contained at least an oxide of Mg and Nb.

Next, various compositions were examined regarding the magnetic characteristics, using Ar gas or a mixed gas containing Ar gas and an appropriate amount of $O_2$ or $N_2$ as the sputtering gas.

Table 3 shows the magnetic characteristics and the compositions of magnetic films after a heat treatment at 250° C. was performed in a vacuum. The thickness of all the magnetic films was 1 μm.

In Table 3, samples for which there is no description as to an insufficient property had a coercive force of 2 Oe or less, an electric resistivity of 80 μΩcm or more, a saturation magnetic flux density of 1 T or more, and a magnetostriction constant of $0.7 \times 10^{-5}$ or less. The property that is not satisfied is shown in Table 3 as an insufficient property.

In Table 3, a, b, c, d, e, and n are the same as described above.

TABLE 3

| Sample | Composition of magnetic film | Insufficient property | Q* | (b + c) | (b/c) | (d + e) |
|---|---|---|---|---|---|---|
| ba | $Fe_{90}Mg_5V_{0.5}O_{4.5}$ | coercive force | 0.72 | 5.5 | 10 | 4.5 |
| bb | $Fe_{85}Mg_4V_{0.5}O_{10.5}$ | magneto-striction | 2.0 | 4.5 | 8 | 10.5 |
| bc | $Fe_{85}Mg_5V_{0.5}O_{9.5}$ | magneto-striction | 1.52 | 5.5 | 10 | 9.5 |
| bd | $Fe_{85}Mg_6O_9$ | magneto-striction | 1.5 | 6 | — | 9 |
| be | $Fe_{85}Mg_{5.5}Ta_{0.5}O_9$ | | 1.33 | 6 | 11 | 9 |
| bf | $Fe_{85}Mg_7Hf_1O_7$ | coercive force | 0.74 | 8 | 7 | 7 |
| bg | $Fe_{85}Mg_6Hf_1O_8$ | | 0.94 | 7 | 6 | 8 |
| bh | $Fe_{85}Mg_6Ta_{0.5}O_{8.5}$ | | 1.17 | 6.5 | 12 | 8.5 |

TABLE 3-continued

| Sample | Composition of magnetic film | Insufficient property | Q* | (b + c) | (b/c) | (d + e) |
|---|---|---|---|---|---|---|
| bi | $Fe_{75}Mg_9Nb_2O_{14}$ | | 1 | 11 | 4.5 | 14 |
| bj | $Fe_{75}Mg_9Zr_2O_{14}$ | | 1.08 | 11 | 4.5 | 14 |
| bk | $Fe_{75}Mg_9La_2O_{14}$ | | 1.17 | 11 | 4.5 | 14 |
| bl | $Fe_{70}Mg_{12}O_{18}$ | magnetostriction | 1.5 | 12 | — | 18 |
| bm | $Fe_{70}Mg_{10}Ta_2O_{18}$ | | 1.2 | 12 | 5 | 18 |
| bn | $Fe_{70}Mg_{10}Hf_2O_{18}$ | | 1.29 | 12 | 5 | 18 |
| bo | $Fe_{70}Mg_{10}Zr_3O_{17}$ | | 1.06 | 13 | 3.3 | 17 |
| bp | $Fe_{70}Mg_{11}Zr_3N_3O_{18}$ | | 1.05 | 13 | 3.3 | 17 |
| bq | $Fe_{70}Mg_{11}Zr_3N_{10}O_6$ | | 1.3 | 13 | 3.3 | 17 |
| br | $Fe_{70}Mg_{11}Zr_3N_{12}O_4$ | coercive force | 1.37 | 13 | 3.3 | 17 |
| bs | $Fe_{70}Mg_{13}Y_1O_{16}$ | | 1.1 | 14 | 13 | 16 |
| bt | $Fe_{65}Mg_{15}Nb_1O_{19}$ | | 1.09 | 16 | 15 | 19 |
| bu | $Fe_{65}Mg_{13}Hf_2O_{20}$ | | 1.18 | 15 | 6.5 | 20 |
| bv | $Fe_{50}Mg_{11}Y_{11}O_{28}$ | | 1.02 | 22 | 1 | 28 |
| bw | $Fe_{50}Mg_{12}Y_{12}O_{26}$ | | 0.87 | 24 | 1 | 26 |
| bx | $Fe_{50}Mg_{22}La_3O_{25}$ | | 0.94 | 25 | 7.3 | 25 |
| by | $Fe_{50}Mg_{25.5}Ti_{0.5}O_{24}$ | | 0.91 | 26 | 51 | 24 |
| bz | $Fe_{50}Mg_{26}Ti_{0.5}O_{23.5}$ | coercive force | 0.87 | 26.5 | 52 | 23.5 |
| ca | $Fe_{50}Mg_{7.5}Nb_{7.5}O_{35}$ | | 1.33 | 15 | 1 | 35 |
| cb | $Fe_{50}Mg_{7.5}Nb_{6.5}O_{36}$ | magnetostriction | 1.52 | 14 | 1.2 | 36 |
| cc | $Fe_{50}Mg_7Hf_8O_{35}$ | magnetostriction | 1.52 | 15 | 0.88 | 35 |
| cd | $Fe_{45}Mg_{10}Ta_{10}O_{35}$ | saturation magnetic flux density | 1.0 | 20 | 1 | 35 |

Note:
Q* is $(e + q \times d)/(b + c \times n)$

Table 3 indicates that in the case where the magnetic film is expressed by a composition formula $Fe_aMg_bX_cN_dO_e$ (where subscripts a, b, c, d and e represent at. %, and X is at least one selected from the group consisting of Y, Ti, Zr, Hf, V, Nb, Ta and lanthanoid), soft magnetic characteristics with high resistance and high saturation magnetic flux density can be obtained when the following equations are satisfied: $a+b+c+d+e=100$, $50 \leq a \leq 85$, $5.5 \leq b \leq 25.5$, $0.5 \leq c \leq 11$, $6 \leq b+c \leq 26$, $1 \leq b/c \leq 51$, $0 \leq d \leq 10$, and $8 \leq d+e \leq 35$.

X-ray diffraction and TEM observation revealed that these magnetic films are constituted substantially by metal magnetic crystal grains having an average crystal grain diameter of 15 nm or less and grain boundary products substantially covering the metal magnetic crystal grains. The metal magnetic crystal grains are constituted mainly by α-Fe, and the grain boundary products contained at least an oxide or a nitride of M and X.

At the same time, when $e+q \times d \leq (b+c \times n) \times 1.35$ is satisfied, low magnetostriction can be obtained. In particular, when $(b+c \times n) \times 0.9 \leq e+q \times d \leq (b+c \times n) \times 1.1$, excellent soft magnetic characteristics with a magnetostriction constant of $0.5 \times 10^{-5}$ or less were obtained.

When sample bv was compared with sample bw, sample bv had a better coercive force.

When Fe in the samples expressed by the above composition formula is substituted up to 5% with at least one selected from the group consisting of Ru, Rh, Ir, Pd, Pt, Ag and Au, the corrosion resistance improved without substantial deterioration of the saturation magnetic flux density and the magnetic characteristics.

In the above example, the magnetic films were formed at room temperature. However, it also was confirmed that the magnetic films can be produced when the substrate temperature for formation of the films is reduced by water cooling or when the substrate temperature is 200° C. or less, preferably 150° C. or less.

Furthermore, in the above example, a heat treatment was performed at 250° C. in a vacuum. However, it also was confirmed that soft magnetic characteristics were exhibited immediately after formation of the film, and the soft magnetic characteristics were not substantially changed at the heat treatment up to 350° C.

It also was confirmed that the magnetic films in the above example were provided with uniaxial magnetic anisotropy, when the films were formed in an uniaxial magnetic field or a heat treatment was performed in an uniaxial magnetic field at a temperature from 150° C. to 350° C. As a result, in the case where these magnetic films are applied to a device in which magnetization is effected in at least a direction of the axis of hard magnetization, high properties with reduced eddy current loss or resonance loss can be achieved at a high frequency of 100 MHz or more.

In the above example, a composite target where a MgO chip is arranged in a target was used. However, it was confirmed that the same magnetic films can be produced by so-called a reactive sputtering technique in which for example, a FeMgX sintered target is sputtered in a mixed gas of Ar and $O_2$. In the above example, sputtering was performed while the substrate was fixed relative to the target. However, it was confirmed that for some compositions, the uniformity of the composition improved and the magnetic characteristics such as magnetostriction improved further by forming the films on a substrate moving to at least two directions, for example, rotating the substrate position relative to the composite target, or translating the substrate relative to the target horizontally or vertically.

Furthermore, in the sputtering technique using the composite target where a metal and a compound are appropriately arranged on the same electrode as in the above example, or the sputtering technique using a metal target and a compound target on at least two different electrodes, when the films were formed while applying a bias to the substrate, the amount of oxygen in the films can be controlled. As a result, the composition amount of O in the film can be controlled to a preferable range of the present invention, and the soft magnetic characteristics such as magnetostriction can be controlled.

Example 2

Next, the results of the examination of $Fe_aM_bX_cN_dO_e$ films are shown below. The conditions under which the films were formed were as follows.

Substrate: non-magnetic ceramic substrate or a Si substrate (the Si substrate was used for analysis of the composition)

Substrate temperature: room temperature–100° C.

Target: a 5×5 mm oxide sintered chip and a 5×5 mm metal element chip were arranged on a 3 inch Fe target in such a manner that the compositions in Table 4 below can be achieved (a part of the oxide chip used had a smaller amount of oxygen than that of the stoichiometric ratio and had oxygen defects).

Target size: 3 inch

Discharge gas pressure: 8 mTorr

Discharge power: 200 W

Sputtering gas: Ar or $Ar+O_2$

Table 4 shows the magnetic characteristics and the compositions of magnetic films after a heat treatment at 250° C. was performed in a vacuum. The thickness of all the magnetic films was 1 μm.

In Table 4, samples for which there is no description as to an insufficient property had a coercive force of 2 Oe or less, an electric resistivity of 80 μΩcm or more, a saturation magnetic flux density of 1 T or more, and a magnetostriction constant of $0.7 \times 10^{-5}$ or less. The property that is not satisfied is shown in Table 4 as an insufficient property.

TABLE 4

| Sample | Composition of magnetic film | Insufficient property | Q* | (b + c) | (b/c) | (d + e) |
|---|---|---|---|---|---|---|
| da | $Fe_{85}Ca_3Zr_3O_9$ | | 1 | 6 | 1 | 9 |
| db | $Fe_{75}Ca_5Ti_5O_{15}$ | | 1 | 10 | 1 | 15 |
| dc | $Fe_{75}Sr_5Ti_5O_{15}$ | | 1 | 10 | 1 | 15 |
| dd | $Fe_{75}Ba_5Ti_5O_{15}$ | | 1 | 10 | 1 | 15 |
| de | $Fe_{75}Mg_{2.5}V_5O_{17.5}$ | | 1.17 | 7.5 | 0.5 | 17.5 |
| df | $Fe_{75}Ca_{2.5}Nb_5O_{17.5}$ | | 1.17 | 7.5 | 0.5 | 17.5 |
| dg | $Fe_{75}Sr_{2.5}V_5O_{17.5}$ | | 1.17 | 7.5 | 0.5 | 17.5 |
| dh | $Fe_{75}Ba_{2.5}Nb_6O_{16.5}$ | | 0.94 | 8.5 | 0.42 | 16.5 |
| di | $Fe_{75}Ba_3Nb_8O_{14}$ | coercive force | 0.61 | 11 | 0.38 | 14 |
| dj | $Fe_{45}Mg_{28}Ce_{0.5}O_{26.5}$ | | 0.92 | 28.5 | 56 | 26.5 |
| dk | $Fe_{45}Mg_{29}Ce_{0.5}O_{25.5}$ | coercive force | 0.86 | 29.5 | 58 | 25.5 |
| dl | $Fe_{45}Ca_8Y_{16}O_{31}$ | | 0.97 | 24 | 0.5 | 31 |
| dm | $Fe_{45}Ca_8Y_{17}O_{30}$ | coercive force | 0.89 | 25 | 0.47 | 30 |
| dn | $Fe_{45}Sr_{4.5}Nb_{10.5}O_{40}$ | | 1.3 | 15 | 0.43 | 40 |
| do | $Fe_{45}Sr_4Nb_{10}O_{41}$ | magnetostriction | 1.41 | 14 | 0.4 | 41 |
| dp | $Fe_{40}Sr_7Ta_{13}O_{40}$ | saturation magnetic flux density | 1.01 | 20 | 0.54 | 40 |

Note:
Q* is $(e + q \times d)/(b + c \times n)$

Table 4 indicates that in the case where the magnetic film is expressed by a composition formula $Fe_aM_bX_cN_dO_e$ (where subscripts a, b, c, d and e represent at. %, M is at least one selected from the group consisting of Be, Mg, Ca, Sr and Ba, X is at least one selected from the group consisting of Y, Ti, Zr, Hf, V, Nb, Ta and lanthanoid), soft magnetic characteristics together with high resistance and high saturation magnetic flux density can be obtained when the following equations are satisfied: a+b+c+d+e=100, $45 \leq a \leq 85$, $5.5 \leq b \leq 28$, $0.5 \leq c \leq 16$, $6 \leq b+c \leq 28.5$, $0.4 < b/c \leq 56$, $0 \leq d \leq 10$, and $8 \leq d+e \leq 40$.

X-ray diffraction and TEM observation revealed that these magnetic films are constituted mainly by metal magnetic crystal grains having an average crystal grain diameter of 15 nm or less and grain boundary products substantially covering the metal magnetic crystal grains. The metal magnetic crystal grains are constituted mainly by α-Fe, and the grain boundary products contained at least an oxide or a nitride of M and X.

At the same time, when $e+q \times d \leq (b+c \times n) \times 1.35$ is satisfied, low magnetostriction can be obtained. In particular, when $(b+c \times n) \times 0.9 \leq e+q \times d \leq (b+c \times n) \times 1.1$, excellent soft magnetic characteristics with a magnetostriction constant of $0.5 \times 10^{-5}$ or less were obtained.

When Fe in the samples expressed by the above composition formula is substituted up to 5% with at least one selected from the group consisting of Ru, Rh, Ir, Pd, Pt, Ag and Au, the corrosion resistance improved without substantial deterioration of the saturation magnetic flux density and the magnetic characteristics.

Also when a magnetic metal in which Fe in the above example is substituted up to 70% with Co or Ni is used, both excellently high saturation magnetic flux density and high resistance and soft magnetic characteristics can be obtained in the same composition ranges as above.

In the above example, the magnetic films were formed at room temperature. However, it also was confirmed that the magnetic films can be produced when the substrate temperature for formation of the films is reduced by water cooling or when the substrate temperature is 200° C. or less, preferably 150° C. or less.

Furthermore, in the above example, a heat treatment was performed at 250° C. in a vacuum. However, it also was confirmed that soft magnetic characteristics were exhibited immediately after formation of the film, and the soft magnetic characteristics were not substantially changed at a heat treatment up to 350° C.

It also was confirmed that the magnetic films in the above example were provided with uniaxial magnetic anisotropy, when the films were formed in an uniaxial magnetic field or a heat treatment was performed in an uniaxial magnetic field at a temperature from 150° C. to 350° C. As a result, in the case where these magnetic films are applied to a device in which magnetization is effected in at least a direction of the axis of hard magnetization, high properties with reduced eddy current loss or resonance loss can be achieved at a high frequency of 100 MHz or more.

In the above example, a composite target where a MgO chip is arranged in a target was used. However, it was confirmed that the same magnetic films can be produced by so-called a reactive sputtering in which for example, a FeMgX sintered target is sputtered in a mixed gas of Ar and $O_2$. In the above example, sputtering was performed while the substrate was fixed relative to the target. However, it was confirmed that for some compositions, the uniformity of the composition improved and the magnetic characteristics such as magnetostriction improved further by forming the films on a substrate moving to at least two directions, for example, rotating the substrate position relative to the composite target, or translating the substrate relative to the target horizontally or vertically.

Furthermore, in the sputtering technique using the composite target where a metal and a compound are appropriately arranged on the same electrode as in the above example, or the sputtering technique using a metal target and a compound target on at least two different electrodes, when the films were formed while applying a bias to the substrate, the amount of oxygen in the films can be controlled. As a result, the composition amount of O in the film can be controlled to a preferable range of the present invention, and the soft magnetic characteristics such as magnetostriction can be controlled.

Example 3

FeMgHfO magnetic films were produced using a type of tandem sputtering technique in which a substrate is moved between positions immediately above two different targets while discharging the two targets with different electrodes. The conditions under which the films were formed were as follows.

Substrate: non-magnetic ceramic substrate, a Si substrate (the Si substrate was used for analysis of the composition)

Substrate temperature: water cooling

Target: a composite target where a 5×5 mm Hf chip placed on a 4 inch Fe target and a 4 inch Mg target.

Discharge gas pressure: 5 mTorr

Discharge power: 200 W for the Fe composite target and 300 W for the Mg target.

Sputtering gas: Ar alone when the substrate is above the Fe+Hf target, and Ar+$O_2$ when the substrate is above the Mg target.

Changing the movement cycle of the substrate changed the transit time per one transit above each of the targets (substantial film-forming time for one transit) and changed the film-forming cycle of the FeHf layer and the MgO layer.

The overall film composition of all of the magnetic films was substantially $Fe_{61.5}Mg_{,16}Hf_{1.5}O_{21}$. For comparison, using MgO chip and a Hf chip arranged on a Fe target, $Fe_{61.5}Mg_{16}Hf_{1.5}O_{21}$ was produced with no cycle (i.e., the cycle length corresponds to a thickness of the film). Table 5 shows the magnetic characteristics and the compositions of magnetic films after a heat treatment was performed at 250° C. in a vacuum. The thickness of all the magnetic films was 1 μm.

TABLE 5

| Sample | Cycle length (nm) | Coercive force (Oe) | Magnetostriction (×10⁻⁵) | Resistivity (μΩ cm) |
|---|---|---|---|---|
| ea | 1000 | 0.9 | 0.3 | 200 |
| eb | 100 | 10 | −1.0 | 100 |
| ec | 50 | 1.5 | −0.5 | 80 |
| ed | 10 | 0.6 | −0.1 | 190 |
| ee | 5 | 0.8 | 0.1 | 180 |
| ef | 0.5 | 0.9 | 0.3 | 200 |

A corrosion resistance test was conducted on the magnetic films of Table 5 by immersing the films in a 0.1 mol salt water. The results confirmed that as the cycle was shorter, the corrosion resistance was higher. Furthermore, in a film with a film-forming cycle length of 10 nm or less, both small magnetostriction and high resistance were obtained. When these films were examined regarding the compositional change in the film thickness direction with an Auger depth profile, the results were that sample ef hardly was distinguished from sample ea, but for samples ee and ed, mainly the composition of Mg was changed. These results indicate that the magnetic film can have excellent soft magnetic characteristic and high resistance when the composition of the M element is changed in the film thickness direction and the cycle of the compositional change was 10 nm or less.

In the above example, a film whose composition is changed by tandem sputtering is produced. However, other experiments showed that similar structures and magnetic characteristics were obtained by pulse reactive sputtering, in which an oxygen gas is introduced periodically while discharging a FeHfMg sintered target with an Ar gas.

Furthermore, it also was confirmed that the same effects were obtained not only in the above composition examples, but also other compositions, as long as the composition is in the preferable composition ranges of the present invention.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic film expressed by a composition formula $T_aM_bX_cN_dO_e$, where

T is either Fe or a metal alloy comprising not less than 30 at. % of Fe and at least one selected from the group consisting of Co and Ni, M is at least one selected from the group consisting of Be, Mg, Ca, Sr and Ba, and X is at least one selected from the group consisting of Y, Ti, Zr, Hf, V, Nb, Ta and lanthanoid series, a, b, c, d, and e represent at. % and satisfy the following equations $a+b+c+d+e=100$, $45 \leq a \leq 85$, $5.5 \leq b \leq 28$, $0.5 \leq c \leq 16$, $6 \leq b+c \leq 28.5$, $0.4 < b/c \leq 56$, $0 \leq d \leq 10$, and $8 \leq d+e \leq 40$, wherein the magnetic film comprises metal magnetic crystal grains having an average crystal grain diameter of not more than 15 nm and a grain boundary product, the main component of the metal magnetic crystal grains is T, the grain boundary product contains at least an oxide or a nitride of M and X, and the magnetic film has a saturation magnetic flux density of not less than 0.8 Tesla and an electric resistivity of not less than 80 μΩcm.

2. The magnetic film according to claim 1, wherein the magnetic film is expressed by a composition formula $Fe_aMg_bX_cN_dO_c$ and has a saturation magnetic flux density of not less than 1 Tesla, wherein a, b, c, d and e represent at. % and are values satisfying the following equations:

$50 \leq a \leq 85$, $5.5 \leq b \leq 25.5$, $0.5 \leq c \leq 11$, $6 \leq b+c \leq 26$, $1 \leq b/c \leq 51$, $0 \leq d \leq 10$, and $8 \leq d+e \leq 35$.

3. The magnetic film according to claim 1, expressed by a composition formula in which $e+q \times d \leq (b+c \times n) \times 1.35$ is satisfied, where b, c, d and e are the same as above, n is a value in a range of 1–2.5 defined by an oxide $XO_n$ where X is at its maximum valence, q is a weighted average of a total amount of a M element and a X element obtained by weighting with the following values: 2.5 for V, Nb and Ta, 2 for Ti, Zr, Hf, Ce, Pr and Tb, and 1.5 for other elements.

4. The magnetic film according to claim 3, expressed by a composition formula in which $(b+c \times n) \times 0.9 \leq e+q \times d(b+c \times n) \times 1.1$, where b, c, d, e, n and q are the same as above.

5. The magnetic film according to claim 1, wherein X is at least one selected from the group consisting of Zr, Nb, Hf and Ta.

6. The magnetic film according to claim 1, wherein not more than 5 at. % of T is substituted with at least one selected from the group consisting of Ru, Rh, Ir, Pd, Pt, Ag and Au.

7. The magnetic film according to claim 1, having a region where a composition is changed with respect to at least the M element substantially periodically in a direction perpendicular to a surface of the film.

8. The magnetic film according to claim 7, wherein the composition changes with cycle length of not more than 10 nm.

9. The magnetic film according to claim 1, produced by supplying M and O to the magnetic film mainly by sputtering an oxide of the M.

10. The magnetic film according to claim 9, produced by performing a heat treatment at a temperature not more than 350° C. after the film is formed.

11. The magnetic film according to claim 1, produced by sputtering a composite target where a metal and a compound are arranged, while moving a substrate to at least two directions relative to the composite target, thereby forming the film on the substrate.

12. The magnetic film according to claim 11, produced by performing a heat treatment at a temperature not more than 350° C. after the film is formed.

13. The magnetic film according to claim 1, produced by sputtering a composite target where a metal and a compound are arranged in a same electrode or sputtering a metal target and a compound target on at least two electrodes, while applying a bias voltage to a substrate, thereby forming the film on the substrate.

14. The magnetic film according to claim 13, produced by performing a heat treatment at a temperature not more than 350° C. after the film is formed.

* * * * *